US009814021B2

(12) United States Patent
Himayat et al.

(10) Patent No.: US 9,814,021 B2
(45) Date of Patent: Nov. 7, 2017

(54) RADIO ACCESS TECHNOLOGY SELECTION IN A HETEROGENEOUS NETWORK

(71) Applicants: Nageen Himayat, Fremont, CA (US); Shu-Ping Yeh, New Taipei (TW); Shilpa Talwar, Los Altos, CA (US); Rath Vannithamby, Portland, OR (US)

(72) Inventors: Nageen Himayat, Fremont, CA (US); Shu-Ping Yeh, New Taipei (TW); Shilpa Talwar, Los Altos, CA (US); Rath Vannithamby, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 144 days.

(21) Appl. No.: 14/769,187

(22) PCT Filed: Feb. 28, 2014

(86) PCT No.: PCT/US2014/019299
§ 371 (c)(1),
(2) Date: Aug. 20, 2015

(87) PCT Pub. No.: WO2014/134407
PCT Pub. Date: Sep. 4, 2014

(65) Prior Publication Data
US 2015/0382224 A1 Dec. 31, 2015

Related U.S. Application Data

(60) Provisional application No. 61/771,698, filed on Mar. 1, 2013.

(51) Int. Cl.
*H04W 72/00* (2009.01)
*H04B 7/04* (2017.01)
(Continued)

(52) U.S. Cl.
CPC ........ *H04W 72/005* (2013.01); *H04B 7/0452* (2013.01); *H04B 7/0486* (2013.01);
(Continued)

(58) Field of Classification Search
None
See application file for complete search history.

(56) References Cited

U.S. PATENT DOCUMENTS 8,804,649 B1 * 8/2014 Guan .................... H04W 48/18
370/252
2003/0189912 A1 10/2003 Laitinen et al.
(Continued)

FOREIGN PATENT DOCUMENTS

EP 2 288 091 A1 2/2011
KR 10-0950663 B1 4/2010
(Continued)

OTHER PUBLICATIONS

Shilpa Talwar, et al.; Capacity and Coverage Enhancements in Heterogeneous Networks; Book Chapter submitted, Dec. 2011.
(Continued)

*Primary Examiner* — Diane Lo
(74) *Attorney, Agent, or Firm* — Thorpe North & Western

(57) ABSTRACT

A technology for a user equipment (UE) in a multiple radio access technology (multi-RAT) heterogeneous network (HetNet) that is operable to provide node-selection measurement information to a central controller. Node-selection measurement information can be determined at the UE for a plurality of nodes in the multi-RAT HetNet. The node-selection measurement information can be communicated from the UE to the central controller. A multi-RAT HetNet node grouping assignment can be receive for the UE from the central controller based on the node-selection measurement information.

29 Claims, 12 Drawing Sheets

(51) Int. Cl.
| | |
|---|---|
| H04B 7/0452 | (2017.01) |
| H04W 36/14 | (2009.01) |
| H04W 36/22 | (2009.01) |
| H04L 5/00 | (2006.01) |
| H04L 12/741 | (2013.01) |
| H04B 7/06 | (2006.01) |
| H04W 24/10 | (2009.01) |
| H04W 72/04 | (2009.01) |
| H04W 72/08 | (2009.01) |
| H04L 29/06 | (2006.01) |
| H04L 29/08 | (2006.01) |
| H04W 4/10 | (2009.01) |
| H04W 12/02 | (2009.01) |
| H04W 12/04 | (2009.01) |
| H04W 76/02 | (2009.01) |
| H04W 24/02 | (2009.01) |
| H04W 24/08 | (2009.01) |
| H04L 12/18 | (2006.01) |
| H04W 52/24 | (2009.01) |
| H04W 72/10 | (2009.01) |
| H04W 16/14 | (2009.01) |
| H04W 76/04 | (2009.01) |
| H04W 36/16 | (2009.01) |
| H04W 36/30 | (2009.01) |
| H04J 3/12 | (2006.01) |
| H04W 48/10 | (2009.01) |
| H04W 48/20 | (2009.01) |
| H04M 15/00 | (2006.01) |
| H04L 25/03 | (2006.01) |
| H04W 4/00 | (2009.01) |
| H04W 88/06 | (2009.01) |
| H04W 88/02 | (2009.01) |
| H04W 88/08 | (2009.01) |
| H04W 84/18 | (2009.01) |
| H04W 4/06 | (2009.01) |

(52) U.S. Cl.
CPC .............. *H04B 7/0626* (2013.01); *H04J 3/12* (2013.01); *H04L 5/0037* (2013.01); *H04L 12/184* (2013.01); *H04L 25/03* (2013.01); *H04L 45/74* (2013.01); *H04L 65/4038* (2013.01); *H04L 65/608* (2013.01); *H04L 65/80* (2013.01); *H04L 67/02* (2013.01); *H04M 15/8044* (2013.01); *H04W 4/10* (2013.01); *H04W 12/02* (2013.01); *H04W 12/04* (2013.01); *H04W 16/14* (2013.01); *H04W 24/02* (2013.01); *H04W 24/08* (2013.01); *H04W 24/10* (2013.01); *H04W 36/14* (2013.01); *H04W 36/165* (2013.01); *H04W 36/22* (2013.01); *H04W 36/30* (2013.01); *H04W 48/10* (2013.01); *H04W 48/20* (2013.01); *H04W 52/244* (2013.01); *H04W 72/044* (2013.01); *H04W 72/0406* (2013.01); *H04W 72/085* (2013.01); *H04W 72/087* (2013.01); *H04W 72/10* (2013.01); *H04W 76/02* (2013.01); *H04W 76/023* (2013.01); *H04W 76/04* (2013.01); *H04W 76/046* (2013.01); *H04W 4/008* (2013.01); *H04W 4/06* (2013.01); *H04W 84/18* (2013.01); *H04W 88/02* (2013.01); *H04W 88/06* (2013.01); *H04W 88/08* (2013.01); *Y02B 60/50* (2013.01)

(56) References Cited

U.S. PATENT DOCUMENTS

| | | |
|---|---|---|
| 2004/0192375 A1 | 9/2004 | Cho et al. |
| 2005/0043026 A1 | 2/2005 | Brok |
| 2006/0268711 A1 | 11/2006 | Doradla |
| 2009/0104907 A1 | 4/2009 | Otting et al. |
| 2012/0322504 A1 | 12/2012 | Chou |
| 2014/0101312 A1* | 4/2014 | Huang .............. H04L 29/06469 709/225 |

FOREIGN PATENT DOCUMENTS

| | | |
|---|---|---|
| WO | WO 2008/025003 A2 | 2/2008 |
| WO | WO 2009/149761 A1 | 12/2009 |
| WO | WO 2010/104921 A1 | 9/2010 |

OTHER PUBLICATIONS

3GPP TSG-RAN WG2 #81 (R2-130444); NTT DOCOMO, Inc.; Deployment scenarios and design goals for dual connectivity; Agenda Item: 7.2; Jan. 28-Feb. 1, 2013.

Ehsan Aryafar, et al; RAT Selection Games in HetNets; 2013 Proceedings IEEE INFOCOM; Apr. 2013.

\* cited by examiner

RADIO ACCESS TECHNOLOGY SELECTION IN A HETEROGENEOUS NETWORK

RELATED APPLICATIONS

This application claims the benefit of and hereby incorporates by reference U.S. Provisional Patent Application Ser. No. 61/771,698, filed Mar. 1, 2013.

BACKGROUND

Users of wireless and mobile networking technologies are increasingly using their mobile devices to send and receive data as well as communicate. With increased data communications on wireless networks the strain on the limited bandwidth and system resources that are available for wireless telecommunications is also increasing. To handle the increasing amount of wireless services to an increasing numbers of users, an efficient use of the available radio network resources has become important.

In homogeneous networks, the transmission station, also referred to as a macro node, can provide basic wireless coverage to mobile devices within a defined geographic region, typically referred to as a cell. Heterogeneous networks (HetNets) were introduced to handle the increased traffic loads on the macro nodes due to increased usage and functionality of mobile devices. HetNets can include a layer of planned high power macro nodes or macro enhanced node Bs (eNBs) overlaid with layers of lower power nodes (micro-nodes, pico-nodes, femto-nodes, home-eNBs, relay stations, etc . . . ) that can be deployed in a less well planned or even entirely uncoordinated manner within the coverage area of the macro nodes. The macro nodes can be used for basic coverage, and the low power nodes can be used to fill coverage holes, to improve capacity in hot-zones or at the boundaries between the macro nodes' coverage areas, and improve indoor coverage where building structures impede signal transmission.

Mobile devices are increasingly equipped with multiple radio access technologies (RATs) that can connect to and choose among the different types of access networks.

A distribution of users across access networks is a factor in the optimization of system performance of a wireless network. Typically, in a user centric access network selection, users only strive to maximize their own throughputs without regard for other users or the network. Users make RAT or cell selection decisions to selfishly maximize their own throughput without receiving cooperation and assistance from the network. However, users selfishly maximizing their own throughput can limit the overall performance of the wireless network relative to what the network is capable of.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
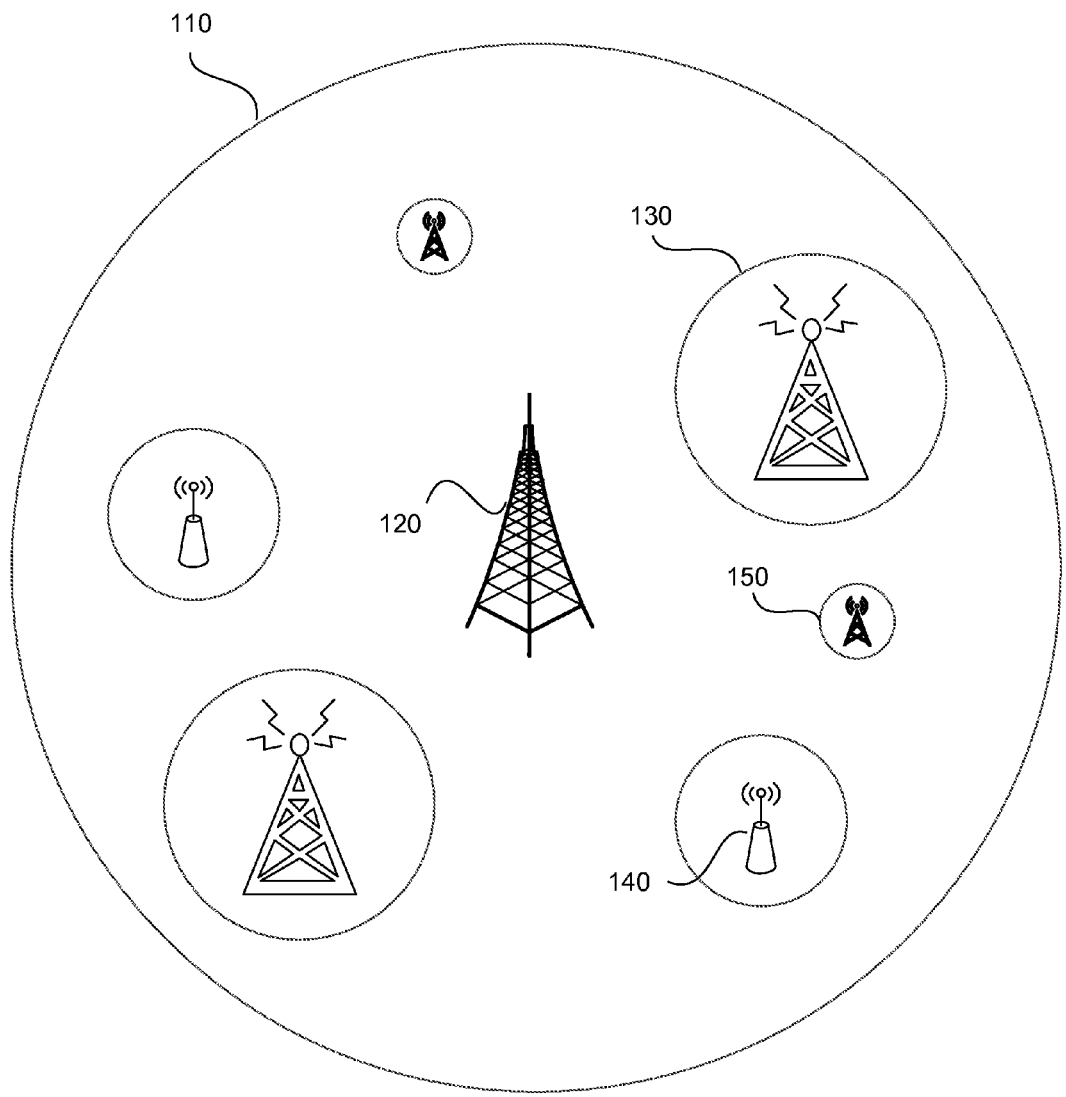
FIG. 1 depicts a multi-RAT HetNet with a macro-cell and a macro-node overlaided with layers of lower power nodes in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

FIG. 1 depicts a multiple radio access technology (multi-RAT) heterogeneous networks (HetNet) with a macro-cell 110 and a macro-node 120 overlaided with layers of lower power nodes including micro-nodes 130, pico-nodes 140, femto-nodes 150, and wireless local area network (WLAN) access points (APs) 160. In one embodiment, the WLAN AP can operate based on a standard such as the Institute of Electronics and Electrical Engineers (IEEE) 802.11-2012, IEEE 802.11ac, or IEEE 80211ad standard. Other wireless standards for wireless networks configured to operate in unlicensed portions of the radio spectrum, such as Bluetooth, can also be used in a multi-RAT HetNet.

Several approaches to distribution of users across access networks have emerged for multiple radio access technology (multi-RAT) HetNets to better distribute the users and optimize system performance. One approach is a UE-centric RAT selection in multi-RAT Het-Nets. For UE-centric RAT selection, each UE selects RAT(s) or cell(s) independent of any cooperation and/or assistance from the multi-RAT Het-Net to maximize its own throughput without assuming any cooperation and assistance from the network. For example, a UE selecting RAT(s) or cell(s) using a UE-centric RAT selection scheme can decide to move from its current cell or RAT if it estimated the UE's throughput for a different RAT would exceed its current throughput by a selected threshold. However, a UE-centric RAT selection scheme can provide for sub-optimal performance, e.g. a gap or reduction in performance, for the network and/or individual UE performance.

The difference in performance between what a wireless network achieves using the UE-centric RAT selection scheme, and what the performance the network is capable of is referred to as an optimality gap. As used herein, performance can refer to communication between a node transceiver, such as an eNB or base station (BS), and wireless mobile devices, such as a UE or mobile station (MS).

In one embodiment, the size of the gap (i.e. the performance of the wireless network using a UE-centric RAT selection scheme) can depend on a ratio of the maximum to the minimum effective user data rate, observed across all possible RAT associations. The effective data rate between a user and a cell can be determined by the UE signal to noise ratio (SNR) or signal to interference plus noise ratio (SINR). In another embodiment, the effective data rate between a user and a cell can be determined by a modulation and coding scheme (MCS). In one example, the MCS can be a quantized version of the Shannon capacity formula that is calculated as R=log 10(1+SINR), where R is the data rate. In another embodiment, the data rate can also be determined using actual rate measurements of a network, wherein training or data signal transmissions can be used to monitor an effective throughput. In one embodiment, for WLAN networks, such as WiFi networks, a round-trip delay between packet transmission and acknowledgements can be used to determine effective data rate.

In one embodiment, the optimality gap of user centric schemes can be reduced by balancing the ratio of the maximum rate to the minimum rate. For example, as the ratio of the maximum to minimum rate approaches one, $$e.g. \frac{R\max}{R\min} \to 1,$$

the optimality gap can be reduced substantially to within a factor of two.

In one embodiment, load balancing can be combined with user-centric RAT selection. The load balancing can be based on balancing a selected rate parameter, such throughput, SNR, SINR, or other desired rate parameter. In one embodiment, load balancing can be accomplished by grouping UEs and cells to equalize the best and worst rate parameters across the UEs. Possible groupings can be determined for the UEs in a selected geographical area or within a wireless network. Once a grouping is determined, the UEs can only select or associate with cells or RATs within the group(s) to enable UE selection based load balancing. In one example, the UE selection based load balancing can enable a UE to select or associate with cells or RATS within a determined grouping while narrowing the optimality gap. In one embodiment, the optimality gap can be narrowed by a factor of 2 when $R_{max}=R_{min}$.

In one embodiment, to determine the groupings, the selected rate parameter is determined or received from the UEs to be grouped. In one embodiment, the groupings are determined semistatically, where the average for the selected parameter can be used for the grouping. In one example, the selected rate parameter of a UE can be based on averaging a rate parameter for the UE with respect to each RAT or cell that the UE is in communication with. In one embodiment, the averaged rate parameter can be an averaging of each SNR or SINR for the UE that corresponds with a RAT or cell. In another embodiment, the averaged SNR or SINR can depend on whether the RATs or cells operate on orthogonal or overlapping channels. For example, different formulas, such as Shannon's formula, can be used to compute the SNR and/or SINR measurements. In another example, link adaptation tables linking rates to the SNR/SINR information can be used.

In one embodiment, grouping information can be exchanged between nodes, UEs, central controllers, base stations, and/or servers to determine the grouping or clustering of the UEs. In one embodiment, the load balancing grouping can be used for multi-RAT HetNets, 3GPP, and/or WLAN networks. In one embodiment, the UEs can discover the base stations (BSs) and/or access points (APs) within range of the UEs. The UEs can measure parameters, such as SNR/SINR, from preambles, beacons, pilot information, and/or measure effective data rates based on estimating or predicting actual rate measurements on test signals, probe signals, or data transmission. In one embodiment, the UEs can also report the measured parameters to a central controller.

Figure 2:
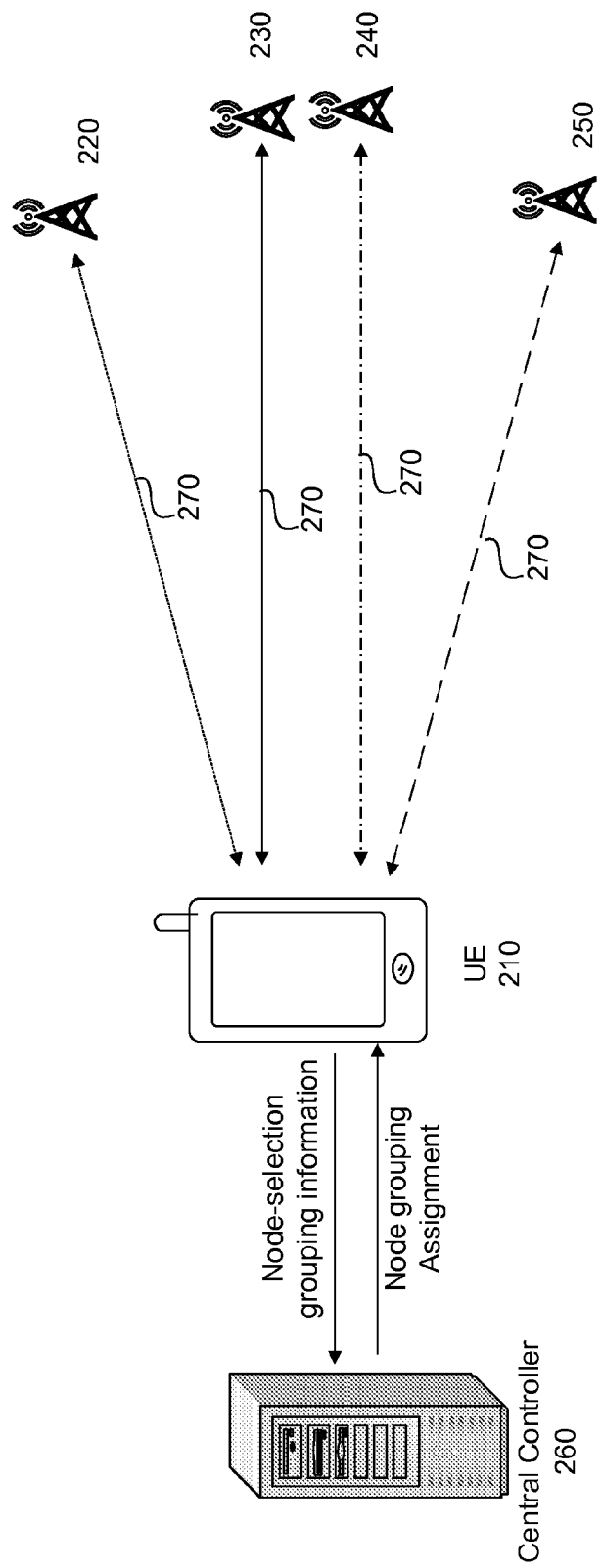
FIG. 2 depicts a user grouping in a multi-RAT network, such as an integrated multi-RAT network in accordance with an example.

FIG. 2 depicts UE 210 communicating with nodes 220-250 and the UE 210 determining the grouping information in connection with each of the nodes 220-250. The UE 210 can collect data 270 from each of the nodes 220-250 and determine the node-selection measurement information at the UE 210. UE 210 can then communicate node-selection measurement information to central controller 260. The central controller 260 can determine the node grouping assignments for UEs in a cell or group of cells in a wireless network based on the node-selection measurement information. The central controller 260 can communicate the node grouping assignment(s) to the UE 210. In one embodiment, the central controller is a macro-base station for a macro-assisted HetNet. Alternatively, the central controller can reside in the core network of a wireless network, such as a 3GPP LTE core network and communicate to the UE via a node, such as a macro eNB or a low power node.

In one embodiment, the central controller can be configured to communicate with multiple RATs or cellular networks. In one embodiment, the RATs used can include but are not limited to multiple different RATs, such as 3GPP RATs, WLAN RATs, mm-wave RATs, D2D RATs, 60 GHz RATs, etc. In one embodiment, the one or more cellular networks can including but not limited to 3GPP LTE Rel. 8, 9, 10, or 11 networks and/or IEEE 802.16p, 802.16n, 802.16m-2011, 802.16h-2010, 802.16j-2009, 802.16-2009 networks. In one embodiment, the central controller can communicate with nodes in multiple RATs via a virtual access network (VAN). Alternatively, the central controller can include transceivers configured to communicate with each RAT.

Figure 3:
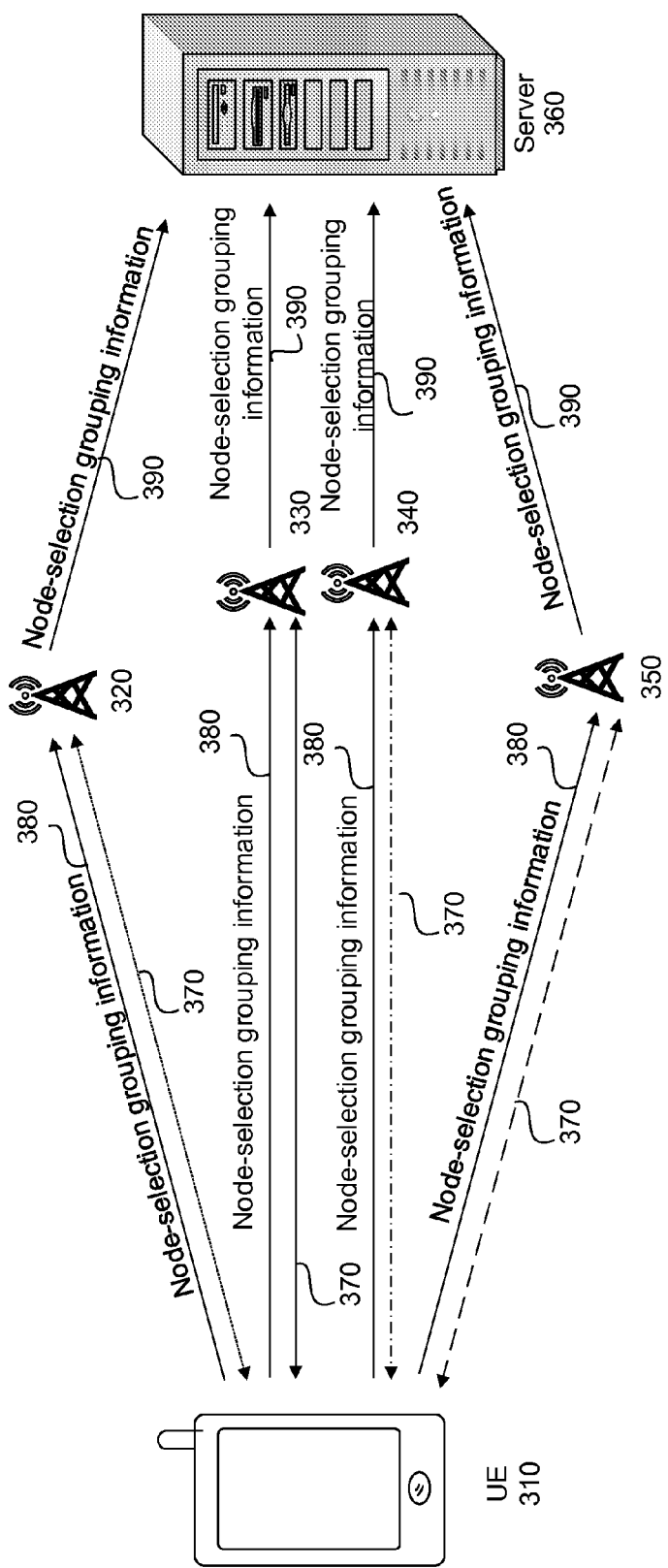
FIG. 3 depicts a grouping method across a multi-RAT HetNet in accordance with an example.

FIG. 3 depicts one embodiment of a UE in a multi-RAT HetNet that is operable to provide node-selection measurement information to a central controller. In FIG. 3, the UE 310 is in communication with a plurality of nodes 320-350. The UE 310 can collect data 370 from each of the nodes 320-350 and determine the node-selection measurement information at the UE 310. In one embodiment, one or more UEs can also report the measured parameters to the BSs or APs within range of each UE or to BSs or APs that each UE prefers. The UE 310 can then communicate the node-selection information 380 to the nodes 320-350, respectively.

The nodes 320-350 can communicate the node-selection measurement information 390 to the server 360. In one embodiment, the BSs or APs can communicate the measured parameters to a self-optimizing network (SON) server. In one embodiment, the measured parameters are communicated to a WiFi controller in a WiFi network, where the WiFi controller is a SON server. In one embodiment, the BSs and/or APs can collaboratively make grouping decisions. In one embodiment, a UE can make a decision based on its relative measured parameters across the RATs. The UE can use a local view of the relative measurement parameters across cells to eliminate certain cells from its cell selection decisions. In another embodiment, the measured parameters are exchanged between BSs and APs. In one embodiment, the BSs can use an X2 interface to exchange information between BSs reported by the UEs.

Figure 4:
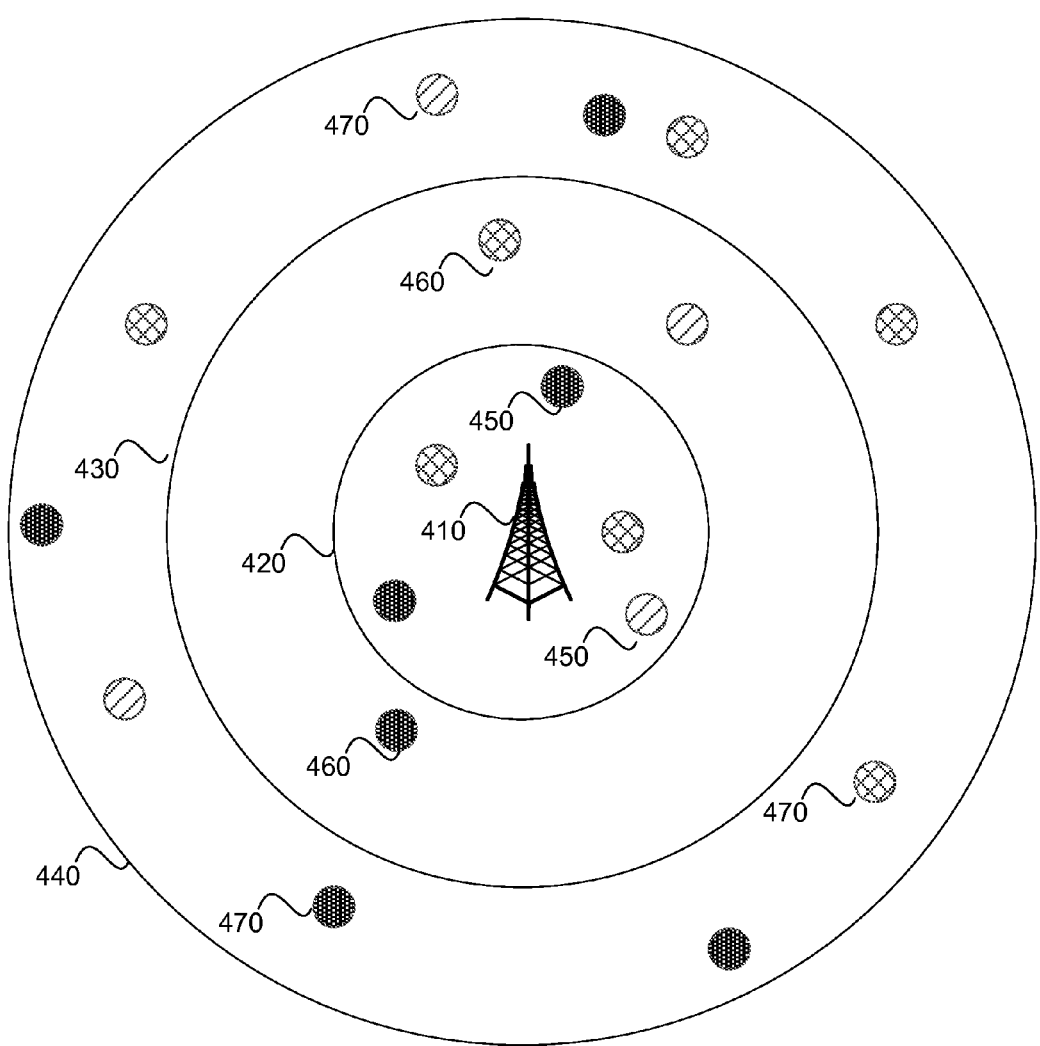
FIG. 4 depicts a user equipment (UE) communicating node-selection measurement information to central controller in accordance with an example.

The grouping decisions can be made to pair a set of users to a group of RATs that the UEs select from. In one embodiment, the UE can be assigned to a plurality of groupings. In one example, the UE can be assigned to an integrated multi-RAT AP, a 3GPP cell, and/or a WiFi cell. FIG. 4 depicts a user grouping in a multi-RAT network, such as an integrated multi-RAT network. In FIG. 4 a plurality of UEs 450 are illustrated in a group 420 that are associated with a 3GPP node. FIG. 4 further illustrates a plurality of UEs 460 in a group 430 that are associated with both a 3GPP node and a WiFi node. FIG. 4 further depicts that a plurality of UEs 470 in a group 440 that are associated with a WiFi node. In one embodiment, cell-edge users can experience co-channel interference and are mapped to a WiFi cell. In another embodiment, the UE can select between WiFi and 3GPP networks. In another embodiment, integrated cells can broadcast a range for the parameters allowable for UE groupings. In one embodiment, the multi-RAT HetNet comprises of one or more cellular network nodes and one or more Institute of Electrical and Electronics Engineers (IEEE) 802.11-2012 configured access points.

Figure 5:
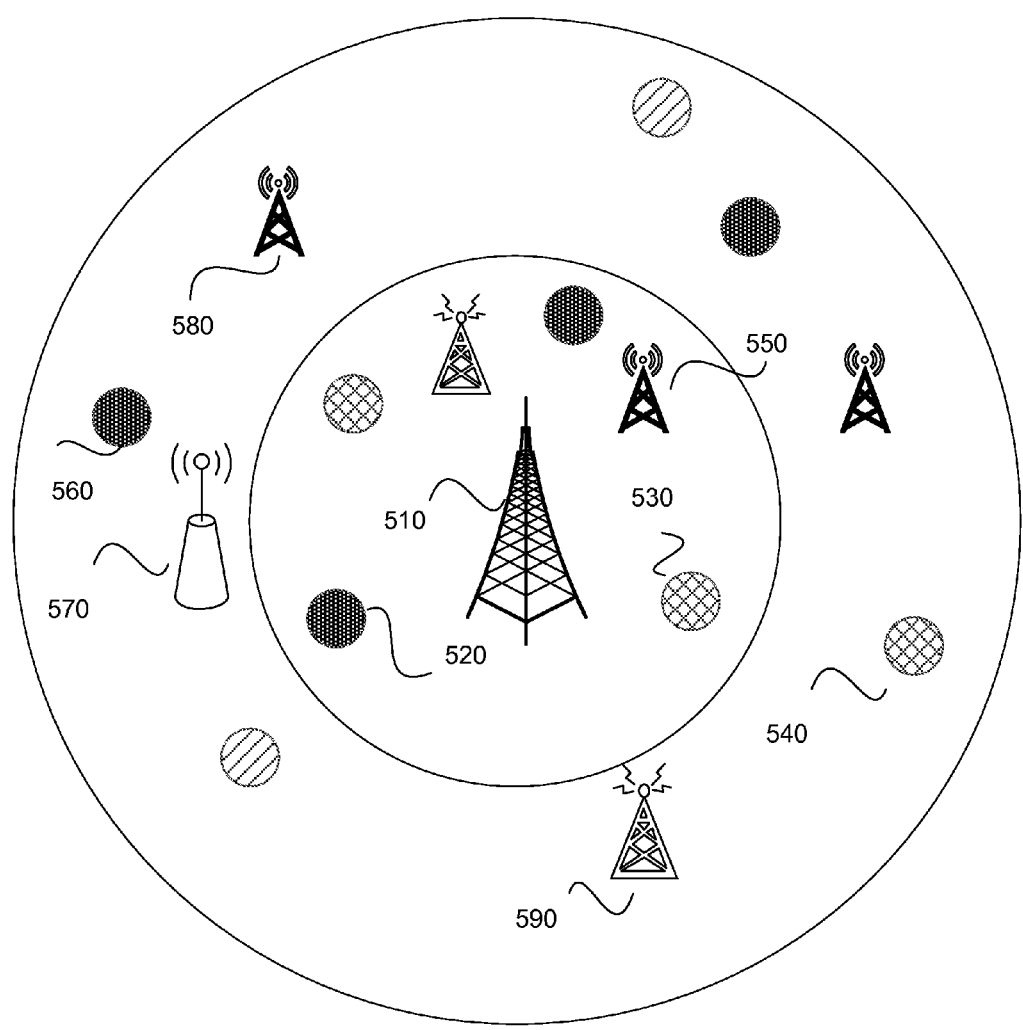
FIG. 5 illustrates a UE in a multi-RAT HetNet that is operable to provide node-selection measurement information to a central controller in accordance with an example.

FIG. 5 depicts a grouping method across a multi-RAT HetNet, where center cell UEs 520 and 530 can use both macro cell 510. Additionally, UE 530 can also use small cell 550. The cell-edge UEs 540 and 560 can be configured to use or associate with small cells. For example, cell-edge UE 540 can use or associate with small cell 590 and cell-edge UE 560 can use or associate with small cells 570 and 580.

In one embodiment, node-selection measurement information can be associated with each BS and/or AP. The node-selection measurement information can be used to determine if a given UE will be permitted to access a given group. In one embodiment, a complete search across multiple groupings can be used to minimize the variability in parameter distributions. In another embodiment, node-selection grouping can be based on a "nearest neighbor only" grouping algorithms. In another embodiment, a UE and/or network can restrict the set of RATs a UE chooses to a selection based on a selected parameter, such as an SNR or SINR cutoff threshold.

In one embodiment, the number of groups for each BS and/or AP that the system will support is fixed. For example, the number of groups for a BS or AP can be set at 2 groups, one group with a high SINR and one group with a low SINR. In another embodiment, the UEs associated with each BS or AP can be rank ordered according to the SNR or SINR of each UE. The rank ordered UEs can then be partitioned into a fixed amount of groups. In one embodiment, the groupings can be determined to allow for equal number of users in each group. In another embodiment, a plurality of metrics can be used to determine the number of users in each group, such as grouping the UEs to maximize the throughput within selected groups. In another embodiment grouping can be based on fractional frequency reuse (FFR) partitioning methods. In one embodiment, the number of groups to create can depend on the number of cells and/or UEs and the relative SNR or SINR distributions across the system. If the variability in SNR or SINR distribution across users is high then more groups can be created.

When the groupings have been made, a set of access permissions across the groups is then determined. For example, for a fixed set of 2 groups, UEs in the first group will be allowed to access the BS while access for users in the second group will be restricted. In one embodiment, after the groupings have been made if there are some UEs that do not have permission to access any group, then those UEs will be given access to select between the RATs that are closest to their parameters and the RATs that are available to them. In one embodiment, a UE can associate with multiple RATs. In another embodiment, a parameter, such as a throughput or rate of a UE can be compared to the parameters of other UEs associated with the RATs. A UE's access to a RAT can be restricted if there is significant mismatch between the UE's parameters and the parameters of other UEs. In one embodiment, a UE can only select between groups for which they have permission to select.

In one embodiment, when grouping decisions or assignments have been determined, they are communicated to the UEs. In one embodiment, grouping decisions can be captured by setting a range of SNR or SINR thresholds per group. The SNR or SINR thresholds can be broadcast by a BS, AP and/or central controller. In another embodiment, both broadcast and uni-cast RRC signaling can be used to communicate such grouping decisions or assignments. In one embodiment, the group decisions or assignments can be made semistatically based on average SNR or SINR metrics. The semistatically based grouping decisions or assignments can change relatively infrequently.

Figure 6:
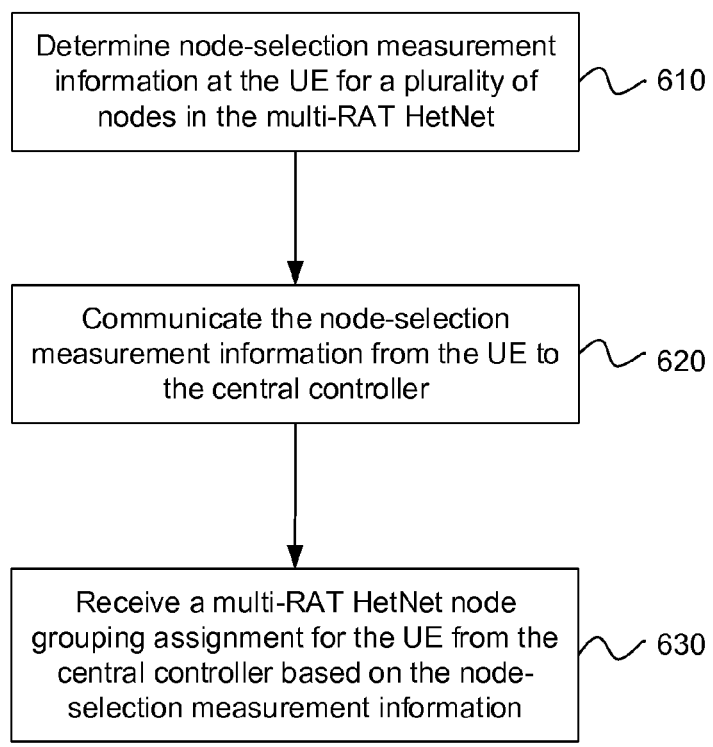
FIG. 6 depicts the functionality of the computer circuitry of a UE in a multi-RAT HetNet that is operable to provide node-selection measurement information to a central controller in accordance with an example.

FIG. 6 uses a flow chart 600 to illustrate the functionality of one embodiment of the computer circuitry with a UE in a multi-RAT HetNet that is operable to provide node-selection measurement information to a central controller. The functionality can be implemented as a method or the functionality can be executed as instructions on a machine, where the instructions are included on at least one computer readable medium or one non-transitory machine readable storage medium. The computer circuitry can be configured to determine node-selection measurement information at the UE for a plurality of nodes in the multi-RAT HetNet, as in block 610. In one embodiment, the node-selection measurement information is determined using a data rate, an effective data rate of a wireless local area network (WLAN) in the multi-RAT HetNet, or an SNR or an SINR of the UE relative to one or more nodes in the multi-RAT HetNet. In one embodiment, the effective data rate of the WLAN is received from one or more WLAN RATs. The computer circuitry can further be configured to communicate the node-selection measurement information from the UE to the central controller, as in block 620. The computer circuitry can also be configured to receive a multi-RAT HetNet node grouping assignment for the UE from the central controller based on the node-selection measurement information, as in block 630. The UE can be assigned to a same multi-RAT HetNet node grouping assignment as UEs with similar SNR, SINR, or effective data rates. In one embodiment, node grouping can be based on a balancing of data rates or SINR values across UEs in a group, wherein the UEs can select a node in a multi-RAT Het-Net. In one embodiment, the computer circuitry is further configured to associate with one or more multi-RAT HetNet nodes based on the multi-RAT HetNet node grouping assignment.

Figure 7:
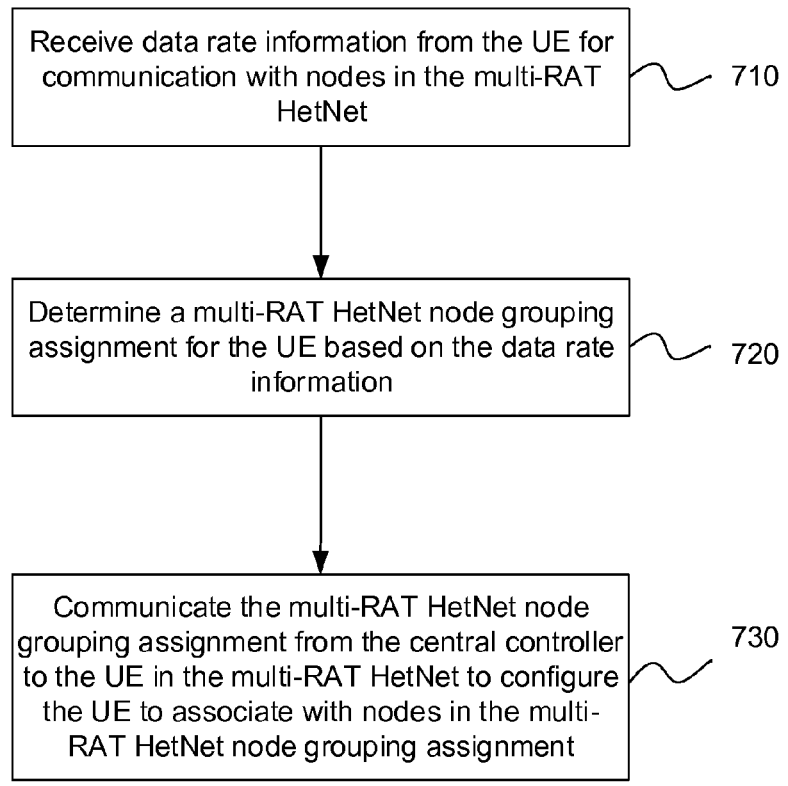
FIG. 7 depicts the functionality of the computer circuitry of a central controller operable in a multi-RAT HetNet that is configured to provide a grouping assignment to a UE in accordance with an example.

FIG. 7 uses a flow chart 700 to illustrate the functionality of one embodiment of the computer circuitry with a central controller operable in a multi-RAT HetNet that is configured to provide a grouping assignment to a UE. The functionality can be implemented as a method or the functionality can be executed as instructions on a machine, where the instructions are included on at least one computer readable medium or one non-transitory machine readable storage medium. The computer circuitry can be configured to receive data rate information from the UE for communication with nodes in the multi-RAT HetNet, as in block 710. The computer circuitry can be further configured to determine a multi-RAT HetNet node grouping assignment for the UE based on the data rate information, as in block 720. In one embodiment, the grouping assignment is based on a near-neighbor only grouping algorithm. In one embodiment, the computer circuitry can also be configured to determine an SNR or an SINR of the UE relative to the nodes in the multi-RAT HetNet, and base the multi-RAT HetNet node grouping assignment on a range of the SNR or SINR for the UE relative to the nodes in the multi-RAT HetNet. In one embodiment, the grouping assignments can be based on the balancing of data rates or SINR values across UEs in a group. In one embodiment, the UEs can select a cell or RAT in multi-RAT Het-Nets. In another embodiment, for a plurality of UEs in the multi-RAT HetNet each UE is assigned to one or more multi-RAT HetNet groups based on a data rate of the UE relative to the nodes for multi-RAT HetNet node grouping assignments. In one embodiment, the computer circuitry can be configured to determine the multi-RAT HetNet node grouping assignments for a plurality of UEs based on the number of UEs in the multi-RAT HetNet and the relative SNR or SINR distributions across the multi-RAT HetNet. The computer circuitry can also be configured to communicate the multi-RAT HetNet node grouping assignment from the central controller to the UE in the multi-RAT HetNet to configure the UE to associate with nodes in the multi-RAT HetNet node grouping assignment, as in block 730.

In one embodiment, the node can be further configured to set access permissions for a group of UEs to access a node in the multi-RAT HetNet. In another embodiment, the access permissions can be restricted when there is significant mismatch between the throughput information of the UE and a throughput information of other UEs.

In one embodiment, the computer circuitry can be configured to receive grouping measurement information from the UE for communication of the UE with nodes in the multi-RAT HetNet and determine the data rate information based on grouping measurement information received from the UE. In one embodiment, the computer circuitry can be configured to update the multi-RAT HetNet node grouping assignment for the UE at a defined time or upon an arrival or a departure of a UE from the multi-RAT HetNet. In one embodiment, the central controller uses a hysteresis to determine when to update the grouping information.

Figure 8:
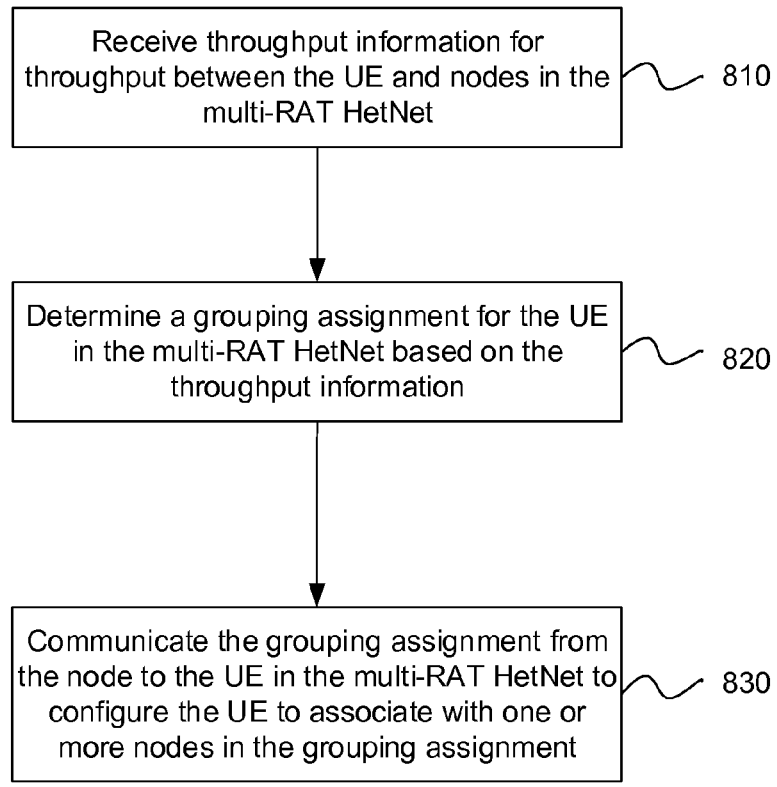
FIG. 8 depicts the functionality of the computer circuitry of a node in a multi-RAT HetNet that is operable to provide a node-grouping assignment to a UE in accordance with an example.
Figure 9:
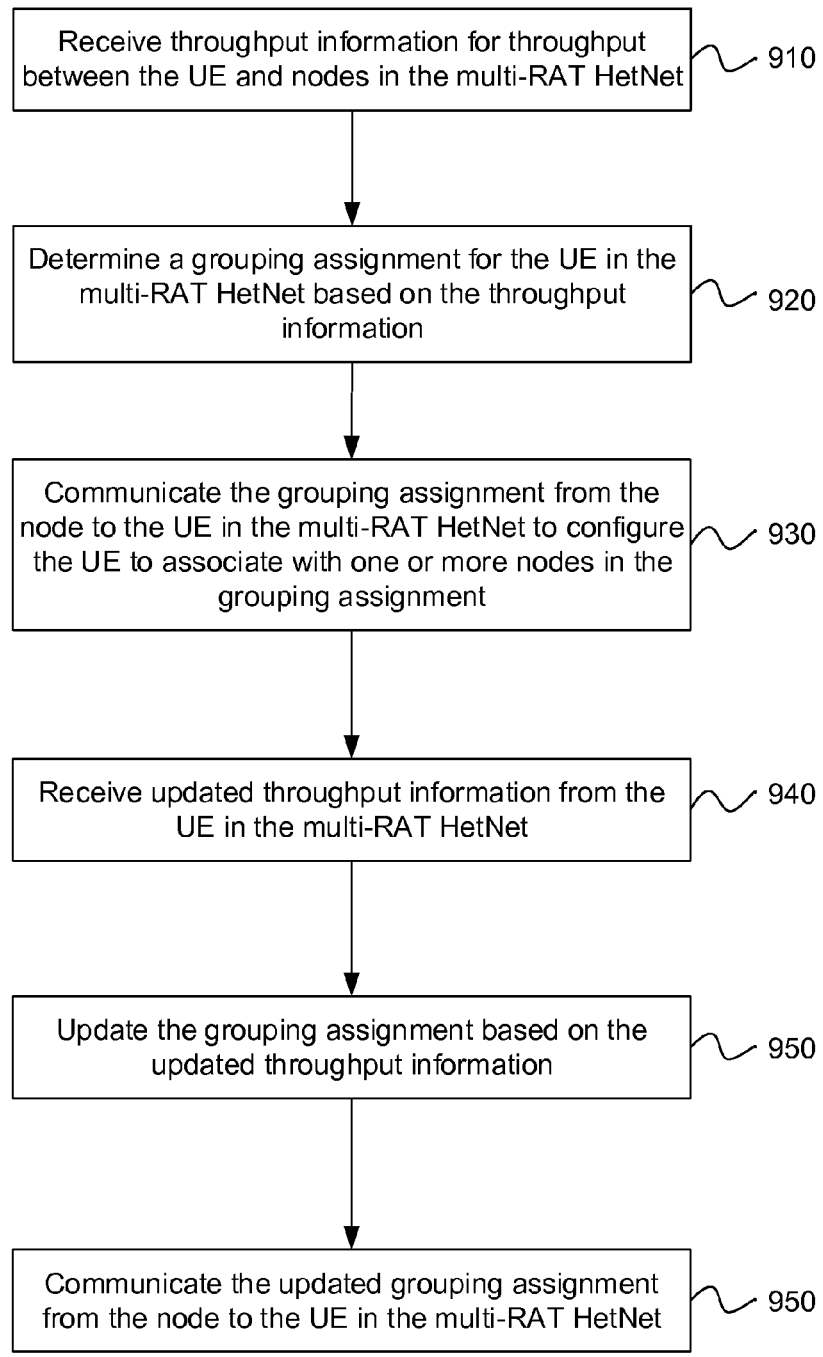
FIG. 9 depicts the functionality of the computer circuitry of a node in a multi-RAT HetNet that is operable to provide a node-grouping assignment to a UE in accordance with an example.

FIG. 8 uses a flow chart 800 to illustrate the functionality of one embodiment of the computer circuitry with a node in a multi-RAT HetNet that is operable to provide a node-grouping assignment to a UE. The functionality can be implemented as a method or the functionality can be executed as instructions on a machine, where the instructions are included on at least one computer readable medium or one non-transitory machine readable storage medium. The computer circuitry can be configured to receive throughput information for throughput between the UE and nodes in the multi-RAT HetNet, as in block 810. In one embodiment, the computer circuitry can communicate the throughput information of the UE to another node in the multi-RAT HetNet. The computer circuitry can be further configured to determine a grouping assignment for the UE in the multi-RAT HetNet based on the throughput information, as in block 820. In one embodiment, the computer circuitry is further configured to determine grouping assignments for a plurality of UEs in the multi-RAT HetNet. In another embodiment, the computer circuitry can be configured to determine a plurality of group assignments for the UE in the multi-RAT HetNet based on the throughput information. In one embodiment, the SNR, SINR, or data rate is equalized for each grouping assignment of the UE in the multi-RAT HetNet. In one embodiment, the computer circuitry is further configured to partition a plurality of UEs into a selected number of groups. In one embodiment, the computer circuitry is further configured to set access permissions for a group of UEs to access a node in the multi-RAT HetNet. In one embodiment, the access permissions are restricted when there is significant mismatch between the throughput information of the UE and a throughput information of other UEs. The computer circuitry can also be configured to communicate the grouping assignment from the node to the UE in the multi-RAT HetNet to configure the UE to associate with one or more nodes in the grouping assignment, as in block 830. FIG. 9 uses a flow chart 900 to illustrate the functionality of one embodiment of the computer circuitry with a node in a multi-RAT HetNet that is operable to provide a node-grouping assignment to a UE. The functionality can be implemented as a method or the functionality can be executed as instructions on a machine, where the instructions are included on at least one computer readable medium or one non-transitory machine readable storage medium. The computer circuitry can be configured to receive throughput information for throughput between the UE and nodes in the multi-RAT HetNet, as in block 910. The computer circuitry can be further configured to determine a grouping assignment for the UE in the multi-RAT HetNet based on the throughput information, as in block 920. In one embodiment, the grouping assignment is based on a near-neighbor only grouping algorithm. The computer circuitry can also be configured to communicate the grouping assignment from the node to the UE in the multi-RAT HetNet to configure the UE to associate with one or more nodes in the grouping assignment, as in block 930. The computer circuitry can also be configured to receive updated throughput information from the UE in the multi-RAT HetNet, as in block 940. The computer circuitry can also be configured to update the grouping assignment based on the updated throughput information, as in block 950. The computer circuitry can also be configured to communicate the updated grouping assignment from the node to the UE in the multi-RAT HetNet, as in block 960.

Figure 10:
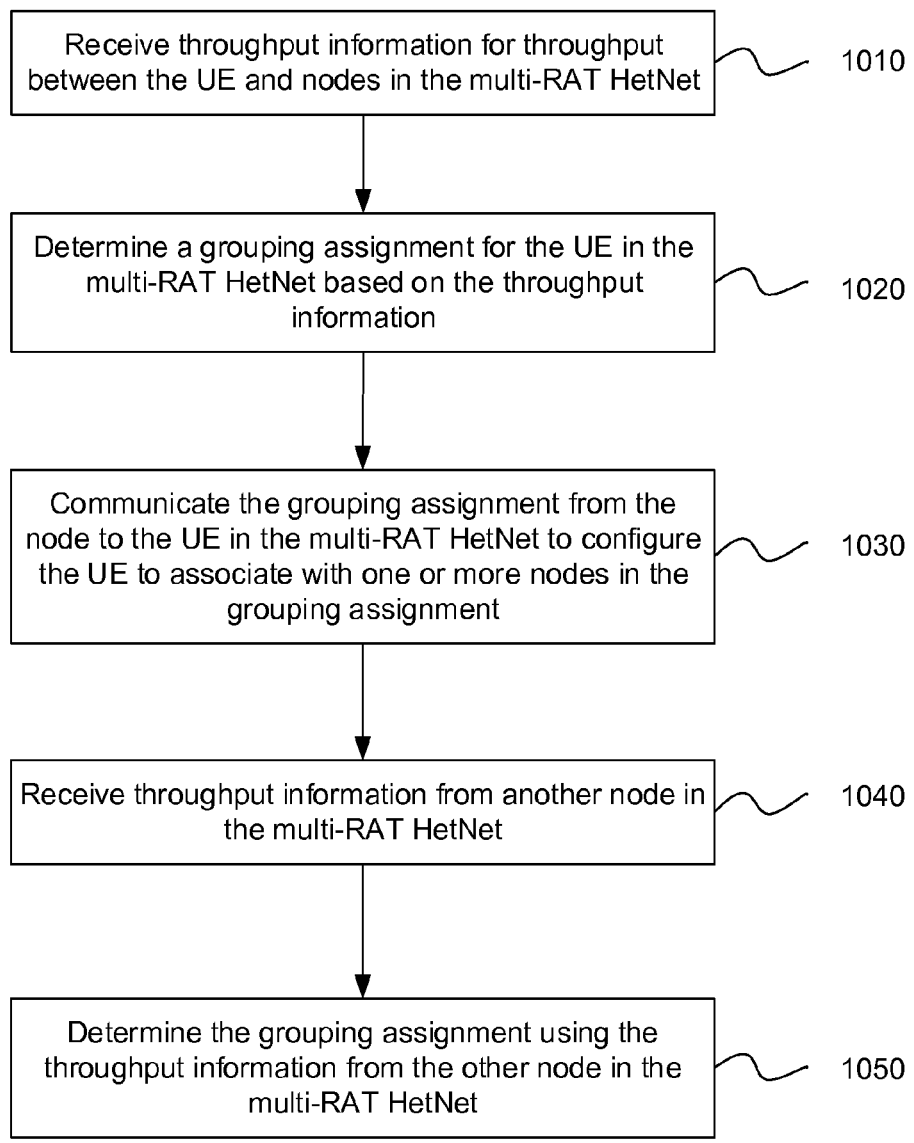
FIG. 10 depicts the functionality of the computer circuitry of a node in a multi-RAT HetNet that is operable to provide a node-grouping assignment to a UE in accordance with an example.

FIG. 10 uses a flow chart 1000 to illustrate the functionality of one embodiment of the computer circuitry with a node in a multi-RAT HetNet that is operable to provide a node-grouping assignment to a UE. The functionality can be implemented as a method or the functionality can be executed as instructions on a machine, where the instructions are included on at least one computer readable medium or one non-transitory machine readable storage medium. The computer circuitry can be configured to receive throughput information for throughput between the UE and nodes in the multi-RAT HetNet, as in block 1010. The computer circuitry can be further configured to determine a grouping assignment for the UE in the multi-RAT HetNet based on the throughput information, as in block 1020. The computer circuitry can also be configured to communicate the grouping assignment from the node to the UE in the multi-RAT HetNet to configure the UE to associate with one or more nodes in the grouping assignment, as in block 1030. The computer circuitry can also be configured to receive throughput information from another node in the multi-RAT HetNet, as in block 1040. The computer circuitry can also be configured to determine the grouping assignment using the throughput information from the other node in the multi-RAT HetNet, as in block 1050.

Figure 11:
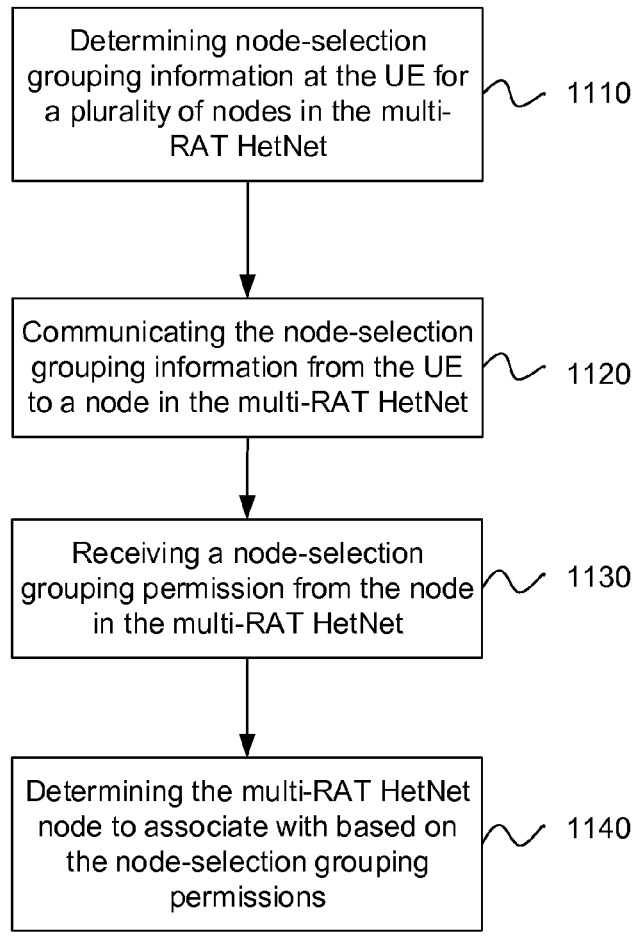
FIG. 11 depicts the functionality of the computer circuitry of a UE in a multi-RAT HetNet that is operable to provide node-selection measurement information to a node in accordance with an example.

FIG. 11 illustrates a method to provide node-selection measurement information to a node. The method can comprise determining node-selection measurement information at the UE for a plurality of nodes in the multi-RAT HetNet, wherein the node-selection measurement information is based on data throughput between the UE and the plurality of nodes, as in block 1110. The method can further comprise communicating the node-selection measurement information from the UE to a node in the multi-RAT HetNet, as in block 1120. The method can further comprise reporting an SNR measurement, an SINR measurement, or a measured data rate for each of the plurality of nodes to determine the signal throughput to enable the node selection grouping permission to be determined. The method can further comprise receiving a node-selection grouping permission from the node in the multi-RAT HetNet, as in block 1130. In one embodiment, the method can further comprise receiving the node-selection grouping permission via unicast or broadcast RRC signaling. The method can further comprise determining a multi-RAT HetNet node to associate with based on the node-selection grouping permission, as in block 1140. In one embodiment, the method can further comprise determining the node-selection grouping permission using a range of the node-selection measurement information, wherein the node-selection measurement information is selected from a data rate, a signal to noise ratio (SNR), or a signal to interference plus noise ratio (SINR) values of the UE relative to one or more nodes in the multi-RAT HetNet. In one embodiment, the method can further comprise associating a plurality of nodes in the multi-RAT HetNet. In another embodiment, the method can further comprise comparing the node-selection measurement information of the UE with the node-selection measurement information of other UEs.

Figure 12:
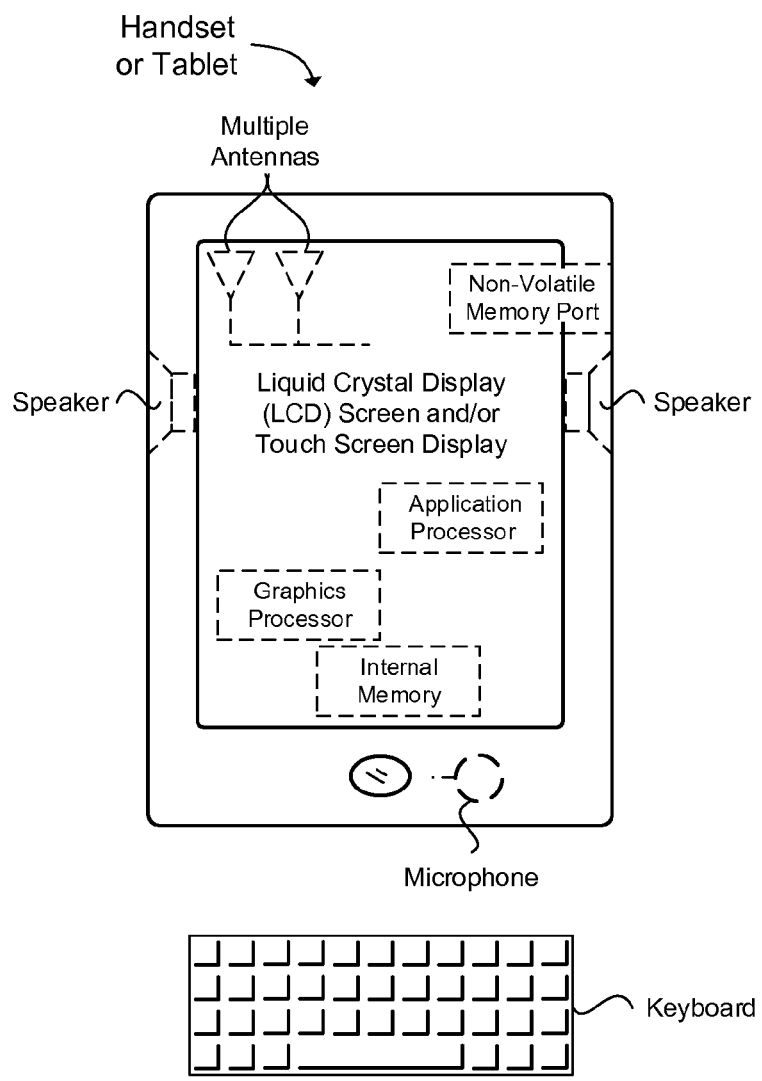
FIG. 12 illustrates a diagram of a user equipment (UE) in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, or other medium for storing electronic data. The base station and mobile station can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) in a multiple radio access technology (multi-RAT) heterogeneous network (HetNet) that is operable to provide node-selection measurement information to a central controller, the UE having computer circuitry configured to:
   determine the node-selection measurement information at the UE for a plurality of nodes in the multi-RAT HetNet;
   communicate the node-selection measurement information from the UE to the central controller; and
   receive a multi-RAT HetNet node grouping assignment for the UE from the central controller based on the node-selection measurement information; and
   wherein the central controller is further configured to determine the multi-RAT HetNet node grouping assignments for a plurality of UEs in the multi-RAT HetNet.

2. The computer circuitry of claim 1, wherein the UE is further configured to associate with one or more multi-RAT HetNet node based on the multi-RAT HetNet node grouping assignment.

3. The computer circuitry of claim 1, wherein the node-selection measurement information is determined using a data rate, an effective data rate of a wireless local area network (WLAN) in the multi-RAT HetNet, or a signal to noise ratio (SNR) or a signal to interference plus noise ratio (SINR) of the UE relative to one or more nodes in the multi-RAT HetNet.

4. The computer circuitry of claim 3, wherein the effective data rate of the WLAN is received from one or more WLAN RATs.

5. The computer circuitry of claim 3, wherein the UE is assigned to a same multi-RAT HetNet node grouping assignment as UEs with similar SNR, SINR, or effective data rates.

6. A central controller operable in a multiple radio access technology (multi-RAT) heterogeneous network (HetNet) that is configured to provide a grouping assignment to a user equipment (UE), the central controller having computer circuitry configured to:
   receive data rate information from the UE for communication with nodes in the multi-RAT HetNet;
   determine a multi-RAT HetNet node grouping assignment for the UE based on the data rate information; and
   communicate the multi-RAT HetNet node grouping assignment from the central controller to the UE in the multi-RAT HetNet to configure the UE to associate with nodes in the multi-RAT HetNet node grouping assignment; and
   wherein the central controller is further configured to determine the multi-RAT HetNet node grouping assignments for a plurality of UEs in the multi-RAT HetNet.

7. The computer circuitry of claim 6, further configured to determine a signal to noise ratio (SNR) or a signal to interference plus noise ratio (SINR) of the UE relative to the nodes in the multi-RAT HetNet.

8. The computer circuitry of claim 7, wherein the multi-RAT HetNet node grouping assignment is based on a range of the SINR or SNR for the UE relative to the nodes in the multi-RAT HetNet.

9. The computer circuitry of claim 6, further configured to:

receive grouping measurement information from the UE for communication of the UE with nodes in the multi-RAT HetNet; and
determine the data rate information based on grouping measurement information received from the UE.

10. The computer circuitry of claim 6, wherein the grouping assignment is based on a near-neighbor only grouping algorithm.

11. The computer circuitry of claim 6, wherein each UE is assigned to one or more multi-RAT HetNet groups based on a data rate of the UE relative to the nodes in the multi-RAT HetNet.

12. The computer circuitry of claim 11, further configured to determine the multi-RAT HetNet node grouping assignments for a plurality of UEs based on the number of UEs in the multi-RAT HetNet and the relative SNR or SINR distributions across the multi-RAT HetNet.

13. The computer circuitry of claim 6, further configured to update the multi-RAT HetNet node grouping assignment for the UE at a defined time or upon an arrival or a departure of a UE from the multi-RAT HetNet.

14. A node in a multiple radio access technology (multi-RAT) heterogeneous network (HetNet) that is operable to provide a node-grouping assignment to a user equipment (UE), the node having computer circuitry configured to:
receive throughput information for throughput between the UE and nodes in the multi-RAT HetNet;
determine a grouping assignment for the UE in the multi-RAT HetNet based on the throughput information; and
communicate the grouping assignment from the node to the UE in the multi-RAT HetNet to configure the UE to associate with one or more nodes in the grouping assignment; and
wherein the node is further configured to determine grouping assignments for a plurality of UEs in the multi-RAT HetNet.

15. The computer circuitry of claim 14, wherein the computer circuitry is further configured to:
receive updated throughput information from the UE in the multi-RAT HetNet;
update the grouping assignment based on the updated throughput information; and
communicate the updated grouping assignment from the node to the UE in the multi-RAT HetNet.

16. The computer circuitry of claim 14, wherein the node is further configured to determine a plurality of group assignments for the UE in the multi-RAT HetNet based on the throughput information.

17. The computer circuitry of claim 14, wherein the node communicates the throughput information of the UE to another node in the multi-RAT HetNet.

18. The computer circuitry of claim 17, wherein the throughput information is determined based on a signal to interference plus noise ratio (SINR) or signal to noise ratio (SNR) of the UE relative to one or more nodes in the multi-RAT HetNet.

19. The computer circuitry of claim 14, wherein the SINR, SNR or data rate is equalized for each grouping assignment of the UE in the multi-RAT HetNet.

20. The computer circuitry of claim 14, the node further configured to:
receive throughput information from another node in the multi-RAT HetNet; and
determine the grouping assignment using the throughput information from the other node in the multi-RAT HetNet.

21. The computer circuitry of claim 14, wherein the node is further configured to partition a plurality of UEs into a selected number of groups.

22. The computer circuitry of claim 14, wherein the node is further configured to set access permissions for a group of UEs to access a node in the multi-RAT HetNet.

23. The computer circuitry of claim 22, wherein the access permissions are restricted when there is significant mismatch between the throughput information of the UE and a throughput information of other UEs.

24. A method for providing node-selection measurement information to a node, comprising:
determining the node-selection measurement information at the UE for a plurality of nodes in the multi-RAT HetNet, wherein the node-selection measurement information is based on data throughput between the UE and the plurality of nodes;
communicating the node-selection measurement information from the UE to a node in the multi-RAT HetNet;
receiving a node-selection grouping permission from the node in the multi-RAT HetNet; and
determining a multi-RAT HetNet node to associate with based on the node-selection grouping permission.

25. The method of claim 24, further comprising determining the node-selection grouping permission using a range of the node-selection measurement information, wherein the node-selection measurement information is selected from a data rate, a signal to noise ratio (SNR), or a signal to interference plus noise ratio (SINR) values of the UE relative to one or more nodes in the multi-RAT HetNet.

26. The method of claim 24, further comprising associating a plurality of nodes in the multi-RAT HetNet.

27. The method of claim 24, further comprising receiving the node-selection grouping permission via unicast or broadcast RRC signaling.

28. The method of claim 24, further comprising comparing the node-selection measurement information of the UE with the node-selection measurement information of other UEs.

29. The method of claim 24, further comprising reporting a signal to noise ratio (SNR) measurement, a signal plus interference to noise ratio (SINR) measurement, or a measured data rate for each of the plurality of nodes to determine the signal throughput to enable the node selection grouping permission to be determined.

* * * * *